US008010616B2

(12) United States Patent
Lee et al.

(10) Patent No.: US 8,010,616 B2
(45) Date of Patent: Aug. 30, 2011

(54) METHOD AND SYSTEM FOR MANAGING MESSAGE THREADS IN CONVERGED IP MESSAGING SERVICE

(75) Inventors: Kyung-Tak Lee, Seoul (KR); Sang-Kyung Sung, Seoul (KR); Wuk Kim, Gwacheon-si (KR); Jae-Kwon Oh, Seoul (KR); Seung-Yong Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/946,573

(22) Filed: Nov. 15, 2010

(65) Prior Publication Data

US 2011/0060805 A1 Mar. 10, 2011

Related U.S. Application Data

(62) Division of application No. 11/939,159, filed on Nov. 13, 2007, now abandoned.

(30) Foreign Application Priority Data

Nov. 13, 2006 (KR) ................................ 2006-111783

(51) Int. Cl.
*G06F 15/16* (2006.01)

(52) U.S. Cl. ........ 709/206; 709/217; 709/218; 709/219; 709/221; 709/223; 709/225; 709/226; 709/227; 709/230; 709/246

(58) Field of Classification Search .................. 709/206, 709/217, 218, 219, 221, 223, 225, 226, 227, 709/230, 246
See application file for complete search history.

(56) References Cited

U.S. PATENT DOCUMENTS

| | | | |
|---|---|---|---|
| 5,444,860 A | 8/1995 | Datwyler et al. | |
| 7,154,863 B2 | 12/2006 | Strathmeyer et al. | |
| 7,221,739 B1* | 5/2007 | Khan et al. | 379/88.13 |
| 7,266,591 B1 | 9/2007 | Johnston | |
| 2001/0036166 A1* | 11/2001 | Park et al. | 370/335 |
| 2004/0248600 A1 | 12/2004 | Kim | |
| 2005/0201357 A1 | 9/2005 | Poyhonen | |
| 2006/0129646 A1* | 6/2006 | Rhee et al. | 709/206 |
| 2006/0165043 A1 | 7/2006 | Yoon | |
| 2006/0212525 A1 | 9/2006 | Atarius et al. | |
| 2007/0156909 A1 | 7/2007 | Osborn et al. | |
| 2007/0168537 A1* | 7/2007 | Misra et al. | 709/230 |
| 2007/0264955 A1* | 11/2007 | Tsai et al. | 455/186.1 |

OTHER PUBLICATIONS

David Geer, "Building Converged Networks With IMS Technology", IEEE Computer Society, p. 14-16, Nov. 2005.

* cited by examiner

*Primary Examiner* — Liangche A Wang
(74) *Attorney, Agent, or Firm* — The Farrell Law Firm, P.C.

(57) ABSTRACT

A mechanism to enable multiple message threads management in the context of the Converged IP Messaging (CPM) service and in the context of CPM inter-working with SMS is provided. A CPM user can simply start a message-based conversation with another CPM or Short Message Service (SMS) user without explicitly establishing a session beforehand. All messages that belong to a given conversation are displayed in the corresponding conversational view (i.e. window) in the CPM user device, even if the conversation is stopped and restarted at a later time, and even if there are multiple message threads available (currently active or stored) in the CPM device. Message structures and behavior of the CPM system elements to enable the functionalities above as well as a mechanism makes the message threads management possible even between a CPM user and an SMS user are also provided.

4 Claims, 9 Drawing Sheets

METHOD AND SYSTEM FOR MANAGING MESSAGE THREADS IN CONVERGED IP MESSAGING SERVICE

PRIORITY

This application is a Divisional Application of U.S. patent application Ser. No. 11/939,159 filed in the U.S. Patent and Trademark Office on Nov. 13, 2007 and this application claims priority under 35 U.S.C. §119(a) to an application entitled "Method And System For Managing Message Threads In Converged IP Messaging Service" filed in the Korean Intellectual Property Office on Nov. 13, 2006 and assigned Serial No. 2006-111783, the contents of which are hereby incorporated by reference.

BACKGROUND OF THE INVENTION

1. Field of the Invention

The present invention relates to a method and system for converged IP messaging service, and in particular, to a method and system for managing message threads in converged IP messaging service.

2. Description of the Related Art

Many different messaging services, such as Short Message Service (SMS), Multimedia Messaging Service (MMS), email, Instant Messaging (IM) service, etc., exist today. Although these services rely on different technologies, user experiences the services provide partially overlap with each other. For example, it is possible to send text messages using all the services cited above, and all services above except for SMS can support the transfer of multimedia content.

Recently, there has been an emergence of a new type of converged messaging service in which the above-mentioned messaging services are synthetically converged. As used herein, such a converged messaging service is called a "Converged IP Messaging (CPM) service." The CPM service is an Session Initiation Protocol (SIP)-based service and is required to be capable of freely performing message communication with users of existing messaging services as well as users of the CPM service. Therefore, the CPM service needs to be capable of inter-working with the existing SMS service, IM service, MMS, Push to talk over Cellular (PoC) service, etc. Further, inter-working between a messaging service through established sessions and a messaging service without establishment of sessions should be possible, and thus standardization of such inter-working is now being in progress.

Figure 1:
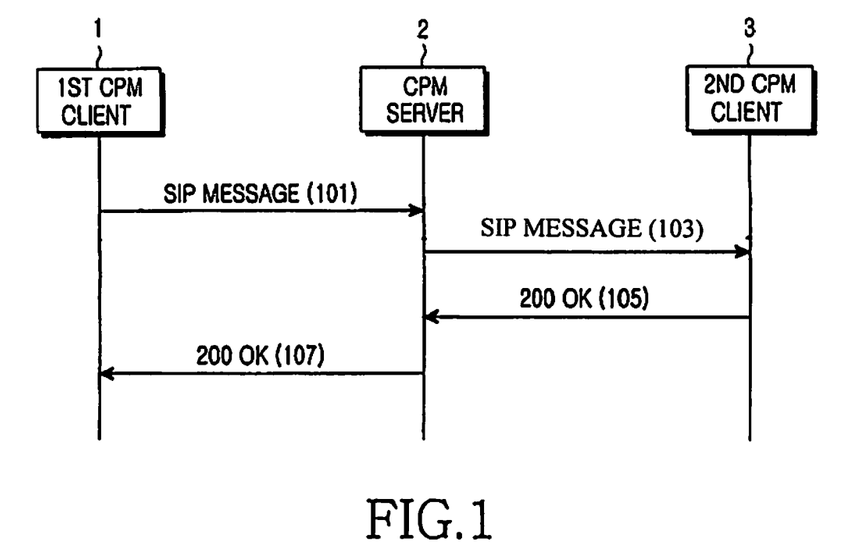
FIG. 1 illustrates a typical flow of processing a CPM message.
Figure 2:
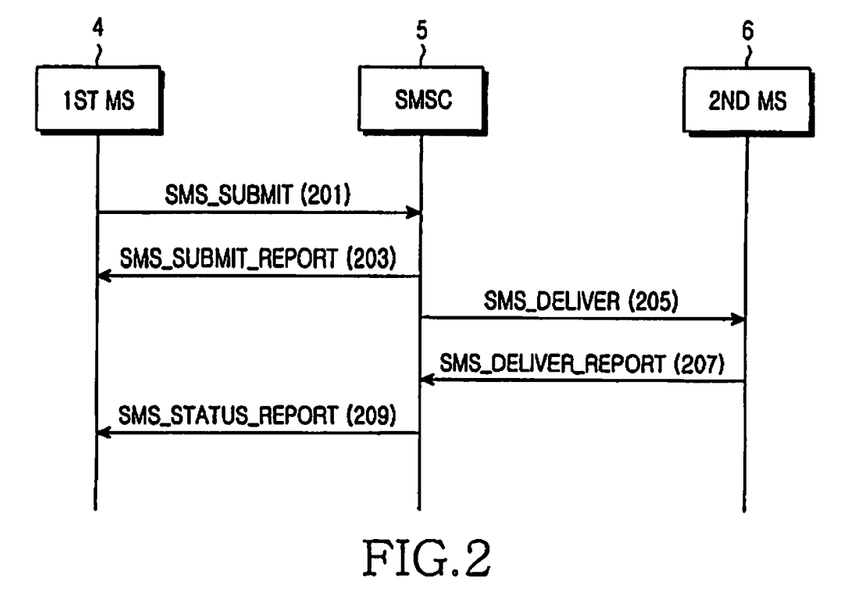
FIG. 2 illustrates a typical flow of processing an SM.

Usually, message transmission/reception in a CPM system is performed according to a process as shown in FIG. 1, and message transmission/reception in an SMS system is performed according to a process as shown in FIG. 2. In order to help understanding of the message transmission/reception process in each system, FIGS. 1 and 2 are based on an assumption that each system includes two users, although each system allows message transmission/reception between multiple users. It is also assumed here that users do not explicitly establish a session before exchanging the messages, i.e. the user who wants to start a conversation can send a message immediately without first requesting the creation of a session.

The CPM service is based on an SIP that provides a protocol to initiate, modify and terminate a session between users. To send messages without initiating a session first, the CPM relies on the SIP MESSAGE extension. FIG. 1 illustrates a typical flow of a message sent from a first user and a second user, represented by a first CPM client 1 and a second CPM client 3 respectively, via a CPM server 2.

In step 101, the first CPM client 1 sends a typical SIP MESSAGE having a configuration as shown in Table 1 to the CPM Server 2.

TABLE 1

MESSAGE sip:user2@domain.com SIP/2.0
    Via: SIP/2.0/TCP user1pc.domain.com;branch=z9hG4bK776sgdkse
    Max-Forwards: 70
    From: sip:user1@domain.com;tag=49583
    To: sip:user2@domain.com
    Call-ID: asd88asd77a@1.2.3.4
    CSeq: 1 MESSAGE
    Content-Type: text/plain
    Content-Length: 18
    Hello Mark, are you there?

In step 103, the CPM server 2 receives the SIP MESSAGE, identifies if the second CPM client 3 is registered in the CPM server 2, and forwards the SIP MESSAGE having a configuration as shown in Table 2 to the second client 3.

TABLE 2

MESSAGE sip:user2@domain.com SIP/2.0
    Via: SIP/2.0/TCP proxy.domain.com;branch=z9hG4bK123dsghds
    Via: SIP/2.0/TCP user1pc.domain.com;branch=z9hG4bK776sgdkse;
                              received=1.2.3.4
    Max-Forwards: 69
    From: sip:user1@domain.com;tag=49394
    To: sip:user2@domain.com
    Call-ID: asd88asd77a@1.2.3.4
    CSeq: 1 MESSAGE
    Content-Type: text/plain
    Content-Length: 18
    Hello Mark, are you there?

The second CPM client 3 receives the message in step 103, and sends back a "200 OK" message having a configuration as shown in Table 3 to the CPM server 2 in step 105.

TABLE 3

SIP/2.0 200 OK
    Via: SIP/2.0/TCP proxy.domain.com;branch=z9hG4bK123dsghds;
                              received=192.0.2.1
    Via: SIP/2.0/TCP user1pc.domain.com;;branch=z9hG4bK776sgdkse;
                              received=1.2.3.4
    From: sip:user1@domain.com;tag=49394
    To: sip:user2@domain.com;tag=ab8asdasd9
    Call-ID: asd88asd77a@1.2.3.4
    CSeq: 1 MESSAGE
    Content-Length: 0

Upon receiving the "200 OK" from the second CPM client in step 105, the CPM server 2 forwards a "200 OK" message having a configuration as shown in Table 4 to the CPM client 1 in step 107.

TABLE 4

SIP/2.0 200 OK
    Via: SIP/2.0/TCP user1pc.domain.com;branch=z9hG4bK776sgdkse;
                              received=1.2.3.4
    From: sip:user1@domain.com;;tag=49394
    To: sip:user2@domain.com;tag=ab8asdasd9
    Call-ID: asd88asd77a@1.2.3.4
    CSeq: 1 MESSAGE
    Content-Length: 0

The SMS follows the protocol defined in 3GPP [TS 23.040]. FIG. 2 illustrates a typical message processing flow when a first Mobile Station (MS) 4 sends a Short Message (SM) to a second MS 6 via a Short Message Service Center (SMSC) 5.

In step 201, the first MS 4 submits an SM to the SMSC 5 by using an SMS_SUBMIT Protocol Data Unit (PDU). At this time, the first MS 4 can also request an SMS status report (SMS_STATUS_REPORT).

Upon receiving the SMS_SUBMIT PDU, the SMSC 5 confirms the reception of the SMS_SUBMIT PDU by sending an SMS_SUBMIT_REPORT PDU back to the first MS 4 in step 203.

In step 205, the SMSC 5 forwards the SM to the second MS 6 through an SMS_DELIVER PDU. Then, in step 207, the second MS 6 acknowledges the reception of the SM by sending an SMS_DELIVER_REPORT PDU back to the SMSC 5. Upon receiving the SMS_DELIVER_REPORT PDU, the SMSC 5 sends an SMS_STATUS_REPORT PDU to the first MS 4 to report that the SM was successfully delivered to the second MS 6 in step 209.

The SMS_SUBMIT PDU includes information elements (from [TS 23.040]) as shown in Table 5.

TABLE 5

| Abbr. | Reference | P[1] | P[2] | Description |
|---|---|---|---|---|
| TP-MTI | TP-Message-Type-Indicator | M | 2b | Parameter describing the message type. |
| TP-RD | TP-Reject-Duplicates | M | b | Parameter indicating whether or not the SC shall accept an SMS-SUBMIT for an SM still held in the SC which has the same TP-MR and the same TP-DA as a previously submitted SM from the same OA |
| TP-VPF | TP-Validity-Period-Format | M | 2b | Parameter indicating whether or not the TP-VP field is present. |
| TP-RP | TP-Reply-Path | M | b | Parameter indicating the request for Reply Path. |
| TP-UDHI | TP-User-Data-Header-Indicator | O | b | Parameter indicating that the TP-UD field contains a Header. |
| TP-SRR | TP-Status-Report-Request | O | b | Parameter indicating if the MS is requesting a status report. |
| TP-MR | TP-Message-Reference | M | I | Parameter identifying the SMS-SUBMIT. |
| TP-DA | TP-Destination-Address | M | 2-12o | Address of the destination SME. |
| TP-PID | TP-Protocol-Identifier | M | o | Parameter identifying the above layer protocol, if any. |
| TP-DCS | TP-Data-Coding-Scheme | M | o | Parameter identifying the coding scheme within the TP-User-Data. |
| TP-VP | TP-Validity-Period | O | o/7o | Parameter identifying the time from where the message is no longer valid. |
| TP-UDL | TP-User-Data-Length | M | I | Parameter indicating the length of the TP-User-Data field to follow. |
| TP-UD | TP-User-Data | O | 3) | |

The SMS_DELIVER PDU includes information elements (from [TS 23.040]) as shown in Table 6.

TABLE 6

| Abbr. | Reference | P[1] | R[2] | Description |
|---|---|---|---|---|
| TP-MTI | TP-Message-Type-Indicator | M | 2b | Parameter describing the message type. |
| TP-MMS | TP-More-Messages-to-Send | M | b | Parameter indicating whether or not there are more messages to send |
| TP-RP | TP-Reply-Path | M | b | Parameter indicating that Reply Path exists. |
| TP-UDHI | TP-User-Data-Header-Indicator | O | b | Parameter indicating that the TP-UD field contains a Header |
| TP-SRI | TP-Status-Report-Indication | O | b | Parameter indicating if the SME has requested a status report. |
| TP-OA | TP-Originating-Address | M | 2-12o | Address of the originating SME. |
| TP-PID | TP-Protocol-Identifier | M | o | Parameter identifying the above layer protocol, if any. |
| TP-DCS | TP-Data-Coding-Scheme | M | o | Parameter identifying the coding scheme within the TP-User-Data. |
| TP-SCTS | TP-Service-Centre-Time-Stamp | M | 7o | Parameter identifying time when the SC received the message. |
| TP-UDL | TP-User-Data-Length | M | I | Parameter indicating the length of the TP-User-Data field to follow. |
| TP-UD | TP-User-Data | O | 3) | |

The TP-UD (User Data) contains the message to be sent. The message can be preceded by a header inside the TP-UD. The presence of the header is indicated by the TP-UDHI (User Data Header Indicator) information element, i.e., a TP-UDHI set to "1" indicates that TP-UD is a header.

The header in the TP-UD may be structured as shown in Table 7 (from [TS 23.040]).

TABLE 7

| Field | Length |
|---|---|
| Length of User Data Header | 1 octet |
| Information-Element-Identifier "A" | 1 octet |
| Length of Information-Element "A" | 1 octet |
| Information-Element "A" Data | 0 to "n" octets |
| Information-Element-Identifier "B" | 1 octet |
| Length of Information-Element "B" | 1 octet |
| Information-Element "B" Data | 0 to "n" octets |
| Information-Element-Identifier "X" | 1 octet |
| Length of Information-Element "X" | 1 octet |
| Information-Element "X" Data | 0 to "n" octets |

The "Information-Element-Identifiers" are predefined values; they all refer to a specific meaning. The list of identifiers and their meaning (for SMS only) are shown in Table 8 (from [TS 23.040]):

TABLE 8

| VALUE (hex) | MEANING | Classification | Repeatability |
|---|---|---|---|
| 00 | Concatenated short messages, 8-bit reference number | SMS Control | No |
| 01 | Special SMS Message Indication | SMS Control | Yes |
| 02 | Reserved | N/A | N/A |
| 03 | Value not used to avoid misinterpretation as <LF> character | N/A | N/A |
| 04 | Application port addressing scheme, 8 bit address | SMS Control | No |
| 05 | Application port addressing scheme, 16 bit address | SMS Control | No |
| 06 | SMSC Control Parameters | SMS Control | No |

TABLE 8-continued

| VALUE (hex) | MEANING | Classification | Repeatability |
|---|---|---|---|
| 07 | UDH Source Indicator | SMS Control | Yes |
| 08 | Concatenated short message, 16-bit reference number | SMS Control | No |
| 09 | Wireless Control Message Protocol | SMS Control | Note 3 |
| ... | ... | ... | ... |
| 1B-1F | Reserved for future EMS features (see subclause 3.10) | N/A | N/A |
| 20 | RFC 822 E-Mail Header | SMS Control | No |
| 21 | Hyperlink format element | SMS Control | Yes |
| 22 | Reply Address Element | SMS Control | No |
| 23 | Enhanced Voice Mail Information | SMS Control | No |
| 24-6F | Reserved for future use | N/A | N/A |
| 70-7F | (U)SIM Toolkit Security Headers | SMS Control | Note 1 |
| 80-9F | SME to SME specific use | SMS Control | Note 2 |
| A0-BF | Reserved for future use | N/A | N/A |
| C0-DF | SC specific use | SMS Control | Note 2 |
| E0-FF | Reserved for future use | N/A | N/A |

Note 1:
The functionality of these IEIs is defined in 3GPP TSG 31.115 [28], and therefore, the repeatability is not within the scope of this document and will not be determined here.
Note 2:
The functionality of these IEIs is used in a proprietary fashion by different SMSC vendors, and therefore, are not within the scope of this technical specification.
Note 3:
The functionality of these IEIs is defined by the WAP Forum and therefore the repeatability is not within the scope of this document and will not be determined here.

The message transmission according to the above-mentioned process may be performed either only once between two users or repeatedly multiple times between the same two users. That is, the users may exchange messages like a conversation through the SMS or CPM service. In this process, two users can handle a conversation by just exchanging a series of messages to each other without explicitly establishing a session beforehand. Therefore, messages that are transmitted to or received from the same counterpart are displayed on an individual window of a user. The same concept is also applicable to the CPM service in which messages are transmitted/received after setup of a session. It is impossible to display a set of messages, which a CPM client has transmitted to or received from the same counterpart according to the CPM service, in a single window, for example, a conversational view. Further, it is also impossible to provide a conversational view including previously exchanged messages in the case of restarting the conversation later, because messages are not bound to any particular session, and thus are not linked to each other.

SUMMARY OF THE INVENTION

The present invention has been made to solve the above-mentioned problems occurring in the prior art, and the present invention provides a method and system for simultaneously providing a single message group including messages transmitted/received between two Converged Internet Protocol Message (CPM) clients to the users.

Also, the present invention provides a method and system for simultaneously providing a single message group including messages transmitted/received between users of heterogeneous services, for example, between a CPM client of a CPM service requiring session setup and a Short Message Service (SMS) user of an SMS that does not require session setup, so that the CPM client can effectively transmit/receive a conversational message without determining if the counterpart of the conversational message is a user for whom the CPM service is supported.

In accordance with an aspect of the present invention, there is provided a CPM system for managing multiple message threads and supporting a Session Initiation Protocol (SIP) based Converged Internet Protocol Messaging Service (CPMS), the CPM system comprises a CPM client for which the CPMS is supported; a non-IP Multimedia Subsystem (IMS) client that has not joined an IMS service; and an Inter-Working Function (IWF) for, when a recipient client of the CPM client is appointed as the non-IMS client by a CPM server and the IWF receives an SIP message for conversational message communication, converting a message format of the SIP message into a message format that can be received by the recipient client, inserting a thread identifier (ID) included in the SIP message into the converted message, and then transmitting the converted message to the recipient client via a server supporting the recipient client.

In accordance with another aspect of the present invention, there is provided a CPM system for managing multiple message threads and supporting an SIP based CPMS, the CPM system comprises a CPM client for which the CPMS is supported; a non-IMS client that has not joined an IMS service; and an IWF for, when a recipient client of the CPM client is appointed as the non-IMS client by a CPM server and the IWF receives an SIP message for conversational message communication, detecting and storing a thread ID from the SIP message, converting a message format of the SIP message into a message format that can be received by the recipient client, transmitting the converted message to the recipient client via a server supporting the recipient client, converting a message received from the recipient client within a predetermined valid reply period to an SIP message, inserting the stored thread ID into the converted SIP message, and transmitting the SIP message to the CPM client via the CPM server.

In accordance with another aspect of the present invention, there is provided a CPM system for managing multiple message threads and supporting an SIP based CPMS, the CPM system comprises a CPM client for which the CPMS is supported; a MS for which an SMS is supported; an IWF for, when a recipient client of the CPM client is appointed as the MS by a CPM server and the IWF receives an SIP message for conversational message communication, converting a message format of the SIP message into a message format of an SMS SUBMIT Protocol Data Unit (SMS_SUBMIT PDU), setting sub-address digits of a TP destination address of the SMS_SUBMIT PDU to a thread ID detected from the SIP message, and then transmitting the SMS_SUBMIT PDU to the SMSC; and the SMSC for receiving the SMS_SUBMIT PDU, converting the SMS_SUBMIT PDU to an SMS DELIVERY Protocol Data Unit (SMS_DELIVER PDU), setting sub-address digits of a TP originator address of the SMS_DELIVERY PDU to the thread ID, and then transmitting the SMS_DELIVERY PDU to the MS.

In accordance with another aspect of the present invention, there is provided a method for managing a message thread including a series of messages transmitted to and received from a same counterpart by a CPM client supporting an SIP based CPMS, the method comprises receiving a request for transmission of a message for conversational message communication from a recipient; when the message is a first message of a new message thread associated with the recipient, allocating a new thread ID to the new message thread, storing the new thread ID in relation to the recipient, inserting the new thread ID into the message, and then transmitting the message; when the message is a subsequent message in an existing message thread associated with the recipient, detecting a thread ID allocated in accordance with the existing message thread, inserting the allocated thread ID in the message, and then transmitting the message; receiving a message for conversational message communication; and when the received message includes a thread ID, providing a user with the received message with messages included in a message thread corresponding to the thread ID included in the received message.

In accordance with another aspect of the present invention, there is provided a method for managing a message thread including a series of messages transmitted to and received from a same counterpart by a CPM client supporting an SIP based CPMS, the method comprises transmitting, by a CPM client for conversational message communication, an SIP message that includes a thread ID allocated to a message thread associated with a recipient appointed as a non-IMS client that has not joined an IMS service; and when an IWF receives the SIP message through a CPM server, converting a message format of the SIP message into a message format that can be received by the recipient, inserting the thread ID in the converted message, and then transmitting the converted message to the recipient, by the IWF.

In accordance with another aspect of the present invention, there is provided a method for managing a message thread including a series of messages transmitted to and received from a same counterpart in a CPM system supporting an SIP based CPMS, the method comprises transmitting, by a CPM client for conversational message communication, an SIP message that includes a thread ID allocated to a message thread associated with a recipient appointed as a non-IMS client that has not joined an IMS service; and when an IWF receives the SIP message through a CPM server, storing the thread ID, an address of the CPM client, and a recipient address, setting a predetermined valid reply period corresponding to the thread ID, converting a message format of the SIP message into a message format that can be received by the recipient, and transmitting the converted SIP message to the recipient through a server supporting the recipient, by the IWF; and when the IWF receives a message from the recipient within the predetermined valid reply period, converting the message received from the recipient into an SIP message, inserting the stored thread ID into the SIP message, and then transmitting the SIP message to the CPM client via the CPM server, by the IWF.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, the same elements will be designated by the same reference numerals although they are shown in different drawings. Further, a detailed description of known functions and configurations incorporated herein will be omitted when it may make the subject matter of the present invention rather unclear.

As used herein, a series of messages transmitted/received between a Converged Internet Protocol Message (CPM) client using the CPM service and the same counterpart is called a "messages thread." The present invention provides a more friendly user interface by grouping and displaying one or more messages included in a message thread on a single window when a CPM client provides the message thread to a user. According to the present invention, when a CPM client performs message communication with a particular counterpart, an identifier is assigned to a message thread corresponding to the particular counterpart and the message is then transmitted with the identifier. At this time, the particular counterpart can be more than one. Further, according to the present invention, the same identifier is included in a message that the CPM client receives from the particular counterpart, so that the CPM client provides the message thread relating to the particular counterpart to the user through a single window. In the present invention, the window in which the messages are displayed is called a "conversational view," and an identifier allocated to each message thread or an identifier allocated to a counterpart of the message communication is called a "thread identifier (ID)." Further, as used herein, a CPM client includes a Mobile Station (MS) that provides a user interface between a user and a CPM system in a communication network providing a CPM service (for example, the user interface directly provides a message to the user and receives an input from the user). Further, the counterpart of the CPM client in the message communication either may be a CPM client or may not be a CPM client. For example, the counterpart may be either a mobile station of a messaging service transmitting/receiving messages without session setup or a client for which an IP Multimedia Service (IMS) is not supported.

The present invention can be applied not only to a message service between CPM clients but also to another messaging system inter-working with the CPM system, which includes, for example, a messaging system that does not provide the IMS and a system providing a messaging service without session setup. Therefore, in the embodiments described below, a system in which a CPM system and an Short Message Service (SMS) system inter-work with each other is discussed to show an application of the present invention to a messaging service between a CPM system and another messaging system as well as a process of providing a message thread in a messaging service between CPM clients.

Figure 3:
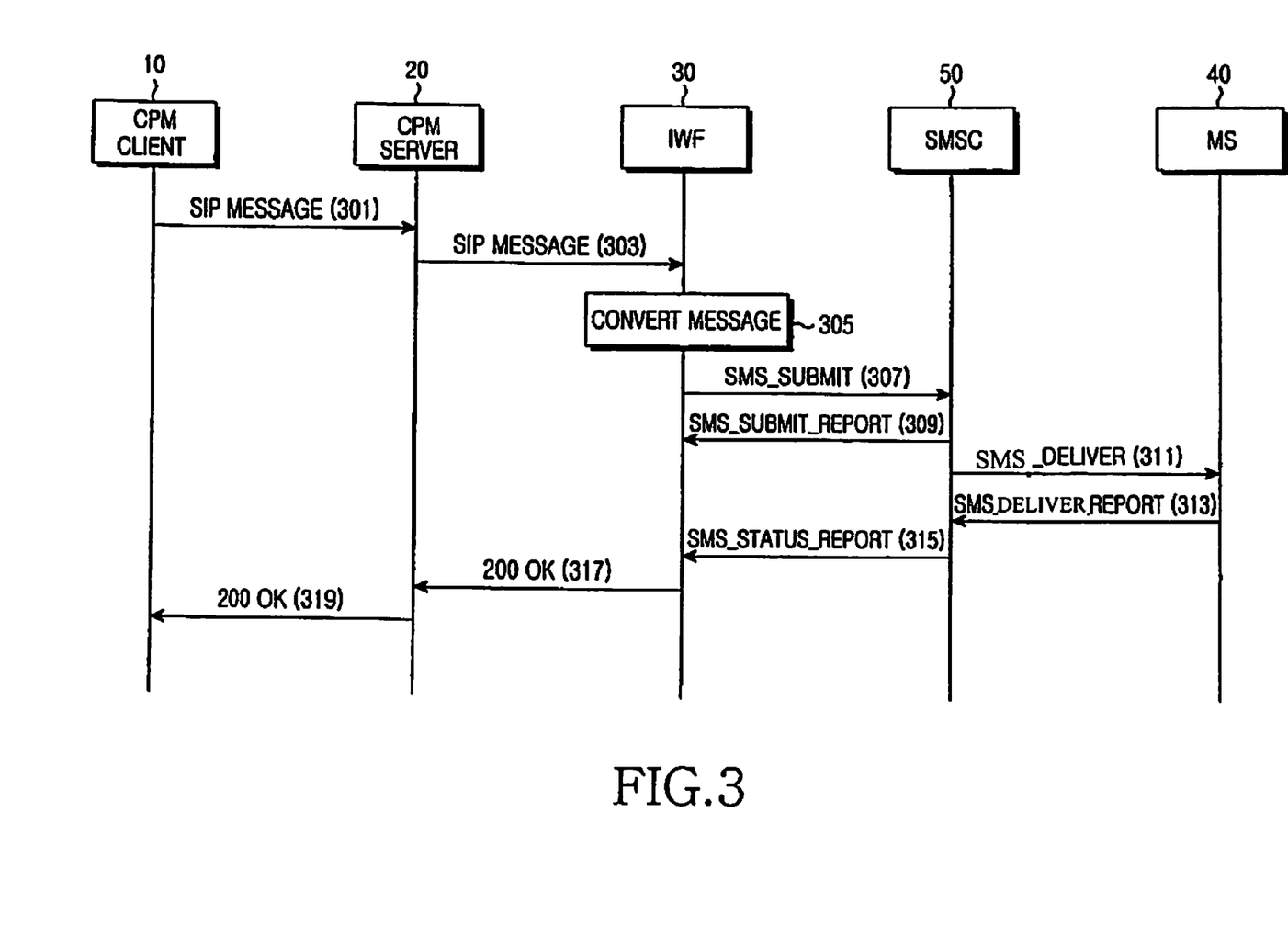
FIG. 3 illustrates a process for processing a message in a system in which a CPM system and a short message system inter-work.

The CPM service is a Session Initiation Protocol (SIP)-based service which requires session setup for a messaging service, while the SMS service does not require session setup for message transmission/reception. Therefore, a CPM system and an SMS system inter-work through an Inter-working Function (IWF). The IWF includes various functions, one representative example of which is the conversion of message formats of a short message and a CPM service message (hereinafter, a "CPM message"). As a result, even when one party sends a CPM message, a counterpart may receive a short message. Further, even when one party sends a short message, a counterpart may receive a CPM message. Such a message processing flow is illustrated in FIG. 3. FIG. 3 illustrates a process for processing a message in a system in which a CPM system and a short message system inter-work, wherein a CPM client 10 transmits a CPM message to a mobile station 60 for which SMS is supported.

Referring to FIG. 3, a CPM client 10 transmits an SIP message through a CPM server 20 to the IWF 30 in steps 301 and 303. The IWF 30 converts the message format from the CPM service to the SMS in step 305, and transmits the message to the Short Message Service Center (SMSC) 50 through the SMS SUBMIT Protocol Data Unit (SMS_SUBMIT PDU) in step 307. Then, The Short Message Service Center (SMSC) 50 transmits the message to the MS 60 through the SMS DELIVERY Protocol Data Unit (SMS_DELIVER PDU) in step 311. The MS 60 transmits an SMS_DELIVER_ REPORT PDU to the SMSC 50 in step 313, and the SMSC 50 transmits an SMS_STATUS_REPORT PDU to the IWF 30 in step 315. Upon receiving the SMS_STATUS_REPORT PDU in step 315, the IWF 30 transmits "200 OK" through the CPM server 20 to the CPM client 10 in steps 317 and 319.

In the case of message transmission as described above, the CPM client 10 cannot differentiate a message thread related to the MS 60 from a message thread related to another communication object. Therefore, according to the present invention, the CPM client 10 inserts a thread ID in an SIP message before transmitting the SIP message. For example, in the present invention, a new eXtensible Markup Language (XML) document containing a <thread-id> tag is included in the SIP message. Table 9 shows an example of such an XML document.

TABLE 9

```
<?xml version="1.0" encoding="UTF-8"?>
<message-grouping
    xmlns="urn:oma:params:xml:ns:cpm:message-grouping"
    xmlns:xsi="http://www.w3.org/2001/XMLSchema-instance"
    xsi:schemaLocation="urn:oma:params:xml:ns:cpm:message-
    grouping">
    <note>This information is to sort messages of the same subjects
    </note>
    <thread-id>Teleworkers</thread-id>
</message-grouping>
```

Further, an XML schema corresponding to Table 9 is illustrated in Table 10.

TABLE 10

```
<?xml version="1.0" encoding="UTF-8"?>
<xs:schema
    targetNamespace="urn:oma:params:xml:ns:cpm:message-grouping"
    xmlns:xs="http://www.w3.org/2001/XMLSchema"
    xmlns="urn:oma:params:xml:ns:cpm: message-grouping"
```

TABLE 10-continued

```
    elementFormDefault="qualified"
    attributeFormDefault="unqualified">
        <xs:element name="note" type="xs:string" minOccurs="0"/>
        <xs:element name="thread-id" type="xs:string"
        minOccurs="0"/>
        <xs:anyAttribute namespace="##other"/>
</xs:schema>
```

In the schema shown in Table 9, "note" refers to a message grouping text, "Thread-id" refers to a messaging subject or a value used for grouping, and "other" refers to a place holder for future extensions. An operation of an originator CPM client 10 for inserting the XML having the above-described configuration into an SIM message is illustrated in FIG. 4.

Figure 4:
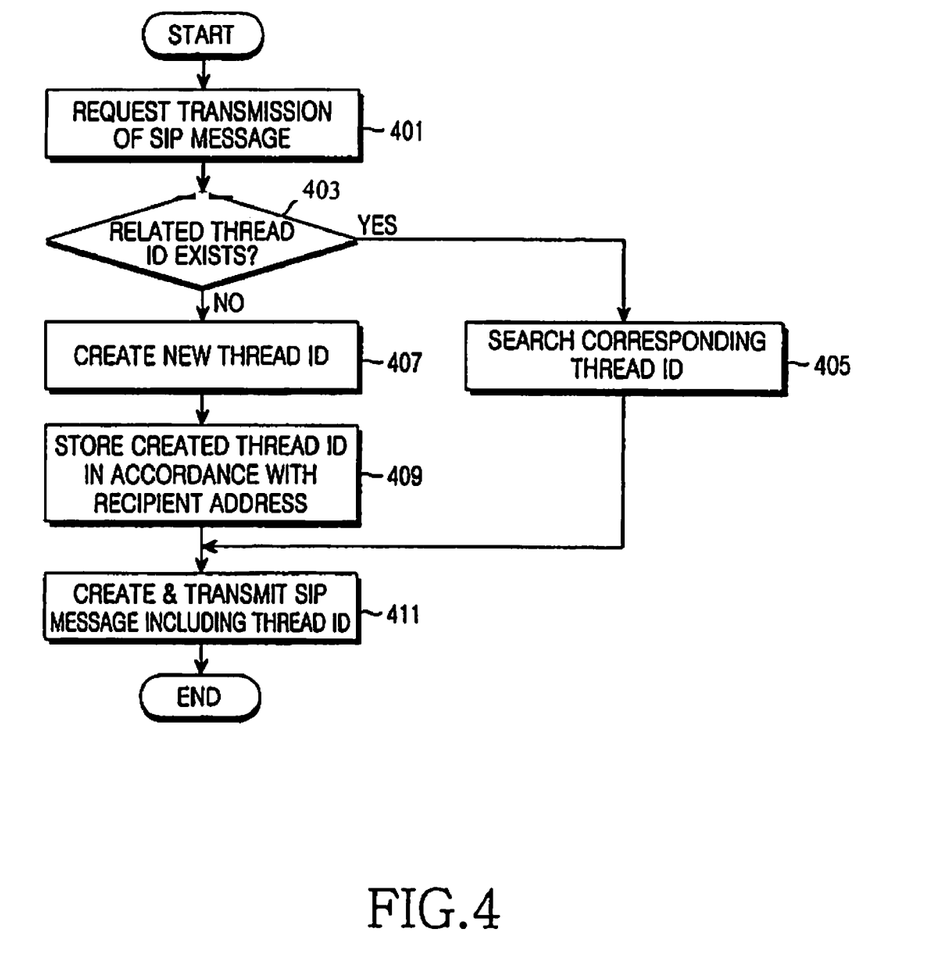
FIG. 4 illustrates an operation of an originator CPM client according to the present invention.

Referring to FIG. 4, when a CPM client 10 receives a request to send a message from the user in step 401, the CPM client 10 proceeds to step 403, in which the CPM client checks if the message is the first message of a new thread or a follow-up message of an existing thread. According to an embodiment of the present invention, the thread database stores an address corresponding to a particular subject and a thread ID allocated to message thread corresponding to the particular subject when the CPM client 10 exchanges messages with the particular subject for conversational messaging communication. The CPM client 10 has the thread database. Further, the thread database may store messages relating to each thread ID in a manner corresponding to the corresponding thread ID or may store messages relating to each thread ID at a position corresponding to the corresponding thread ID. The messages stored in this way are used for configuration of a conversational view. Therefore, referring to FIG. 4 again, when the CPM client 10 has exchanged a message with the message recipient, the message recipient has been allocated a thread ID, the allocated thread ID has been stored in the thread database, and the message corresponds to a follow-up message of an existing thread. Further, when the CPM client 10 has never received a message from the message recipient and the transmitted message is the first message, the message starts a new thread. Therefore, when an allocated thread ID exists in the address of the recipient of the message requested to be transmitted in step 401, the CPM client 10 detects the corresponding thread ID in step 405, and then proceeds to step 411. In contrast, when there is no thread ID allocated to the recipient, the CPM client 10 generates a new thread ID in step 407, stores the generated thread ID with a relation to the address of the recipient of the message in step 409, and then proceeds to step 411. In step 411, the CPM client 10 generates and transmits an SIP message including the detected thread ID or the generated thread ID.

After transmitting the message or identifying a related thread ID, the CPM client 10 may display a conversational view including the message, which corresponds to the recipient. In other words, the CPM client 10 may load messages stored in the thread database in relation to the thread ID corresponding to the message or load messages by referring to the storage positions of the messages stored in the thread database in relation to the thread ID, thereby displaying the loaded messages with the message to be currently transmitted within one conversational view. When the message to be currently transmitted corresponds to a start of a new message thread, a conversational view including only the message to be currently transmitted will be displayed.

When the recipient included in the SIP message transmitted in step 411 is the CPM client, the CPM server 20 transmits the message to a corresponding CPM client according to the same process as the conventional process.

Figure 5:
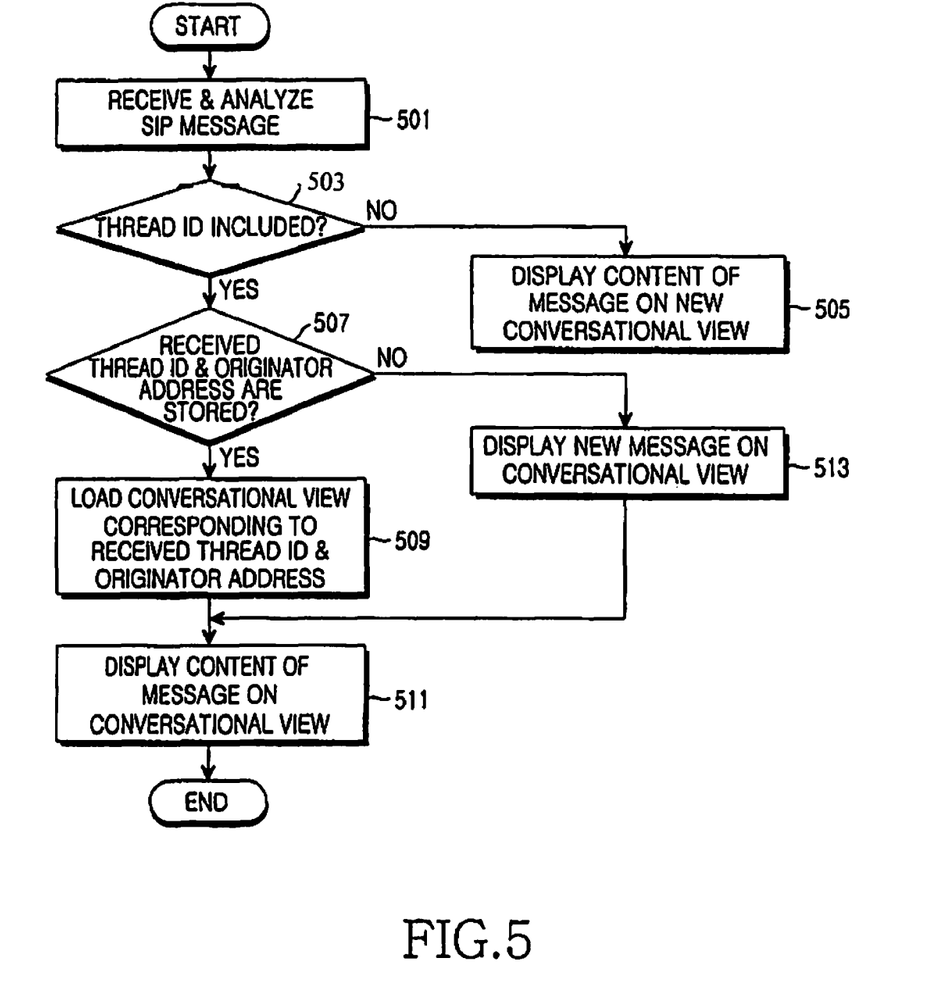
FIG. 5 illustrates an operation process of the CPM client 10 according to the present invention.

FIG. 5 illustrates an operation process of the CPM client 10 according to an embodiment of the present invention, when the CPM client 10 receives a CPM message including a thread ID.

Referring to FIG. 5, the CPM client 10 receives and analyzes a new SIP message in step 501, and then proceeds to step 503. In step 503, the CPM client 10 checks if the SIP message includes a thread ID. When the SIP message does not include any thread ID, the CPM client 10 proceeds to step 505, in which the CPM client simply displays the message in a new conversational view, and ends the procedure. When the SIP message includes a thread ID, the CPM client 10 proceeds to step 507, in which the CPM client 10 determines if the thread ID and a transmitter address (i.e. the associated originator user's address) included in the SIP message are stored in the thread database. The CPM client 10 proceeds to step 509 when they are stored in the thread database, and proceeds to step 511 when they are not stored in the thread database.

The fact that the received thread ID and the originator address are stored in the thread database implies that the message belongs to an existing message thread. Therefore, the CPM client 10 loads the conversational view associated with the thread ID and the originator user in step 509, and then proceeds to step 513.

However, when the received thread ID and the originator address are not stored in the thread database, the message starts a new message thread. Then, the CPM client 10 stores the thread ID and originator's address received in the thread database, and creates a new conversational view associated to them. Then, the CPM client 10 proceeds to step 513. In step 513, the CPM client 10 adds the new message to the conversational view and displays it to the recipient user. This ends the procedure of the CPM client 10.

As described above, each message transmitted/received for conversational message communication between two CPM clients may include an identifier for discriminating the message from another message transmitted to or received from another CPM client other than the two CPM clients. Therefore, the two CPM clients can group the messages exchanged between them, so that the grouped messages can be provided to each user in a form of a conversational view.

Management and provision of such a message thread can be applied to transmission/reception of messages for conversational communication between a CPM client and an MS for which SMS is supported. Therefore, it is possible to make this inter-working as seamless as possible, and the CPM user does not need to be aware of what messaging service the recipient supports.

In the case of message transmission/reception for conversational communication between a CPM client and an MS to which SMS is supported, there are, in general, two methods for providing a message thread to a CPM client. According to the first method, a thread ID is included in an SIP message transmitted by a sender CPM client and a short message transmitted to a recipient in response to the SIP message. According to the second method, an IWF for inter-working a CPM system and an SMS system stores and manages a thread ID allocated to a CPM client of a transmitter side and an MS of a receiver side, and the IWF provides a service related to the thread ID only to the CPM client without providing the thread ID to the MS.

An embodiment according to the first method may extend the thread ID information to the SMS domain. This involves additional information elements in the SM sent to the SMS user, as well as adapted behavior from the MS that receives the SM and sends a reply to it.

Hereinafter, the first method will be described with reference to FIGS. 6 to 8.

Figure 6:
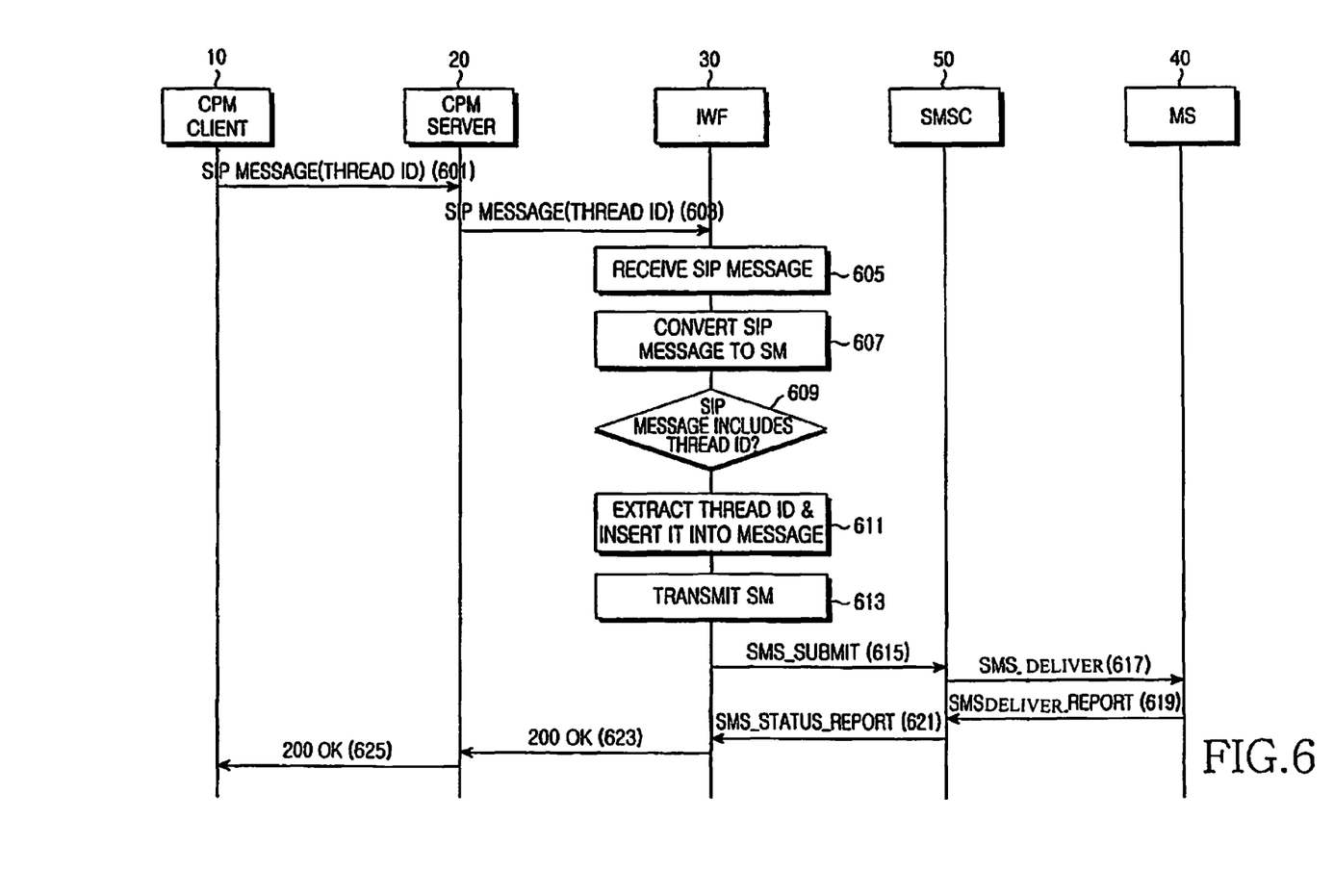
FIG. 6 illustrates a message processing procedure of a short message system and a CPM system inter-working with each other according to the present invention.

FIG. 6 illustrates a message processing procedure of a short message system and a CPM system inter-working with each other according to an embodiment of the present invention. Referring to FIG. 6, the CPM client 10 transmits an SIP message including a message to be transmitted and a thread ID through the CPM server 20 to the IWF 30 in steps 601 and 603. At this time, the process of configuring the SIP message by the CPM client 10 is similar to the process shown in FIG. 4. When the IWF 30 receives the SIP message in step 605, it proceeds to step 607. In step 607, the IWF 30 converts the SIP message to an appropriate Short Message (SM). Then it proceeds to Step 609. The SM may be, for example, an SMS_SUBMIT PDU.

In step 609, the IWF 30 checks if the SIP message contains a thread ID. When a thread ID is present, the IWF 30 proceeds to step 611, and when a thread ID is not present, the IWF 30 proceeds to step 619.

In step 611, the IWF 30 extracts the thread ID and incorporates the extracted thread ID in the SM. Then, the IWF 30 proceeds to step 613.

In step 613, the IWF 30 sends the converted SM to the SMSC 50. Then, in step 615, the IWF 30 transmits the SMS_SUBMIT PDU to the SMSC 50. In step 617, the SMSC 50 transmits the message to the MS 60 through the SMS_SUBMIT PDU. In step 619, the MS 60 transmits SMS_DELIVER_REPORT PDU to the SMSC 50 and provides the message included in the SMS_DELIVER_REPORT PDU. In step 621, the SMSC 50 transmits the SMS_DELIVER_REPORT PDU to the IWF 30. Upon receiving the SMS_DELIVER_REPORT PDU in step 621, the IWF 30 transmits "200 OK" through the CPM server 20 to the CPM client 10 in steps 623 and 625.

Steps 609 and 611 can also occur at any time during the conversion in step 607.

In step 611, the IWF 30 includes the thread ID in the SM to be sent. According to an embodiment of the present invention, the thread ID may be either included in a header of the TP-UD (User Data) of the SM, or included in a body part of the TP-UD, or included in a TP-DA (Destination-Address). When the thread ID is included in a header of the TP-UD of the SM, a new SMS information element is added. However, when the thread ID is included in a body part of the TP-UD or in a TP-DA, it is possible to construct a system without addition of a new information element.

When the thread ID is included in a header of the TP-UD of the SM, there can be many ways for how exactly the thread ID is included in the header. The present invention provides two embodiments, one of which is to include the thread ID in the SMSC control parameter included in the TP-UD, by referring to Table 8. The SMSC control parameter contains information that can be used to control the SMSC, but can also be passed transparently to the recipient MS. The SMSC control parameter contains "Selective Status Report" as octet 1, which controls the creation of status reports, depending on the error code of the particular message. The present invention adds a second octet as shown in Table 11.

TABLE 11

| | Reference | Description |
|---|---|---|
| octet 1 | Selective Status Report | This facility is used to control the creation of Status Reports, depending on the error code of the particular message. It is also used by the sending entity to request inclusion of the |

TABLE 11-continued

| Reference | Description |
| --- | --- |
| | original UDH into the Status Report. In this case the original UDH must be separated from the rest of the UDH using the Source Indicator. The TP-SRR must be set so that the Selective Status Report to be enabled. |
| octet 2 Message thread ID | This facility is used to identify the message thread this SM belongs to. The recipient MS must include this information in any reply to this message. The TP-RP (Reply Path) should be set when using this information. |

The TP-RP (Reply Path) is included in both the SMS_SUBMIT and SMS_DELIVER PDUs to guarantee that the reply goes through the same SMSC that delivered the original message, which guarantees that the SMSC knows the originator MS and is able to forward the reply to the originator.

According to another embodiment for including the thread ID in the header of the TP-UD, a new information element identifier may be added in the TP-UD header. That is, a new information element identifier named "Message Thread Information (MTI)" may be added in the TP-UD header. According to an embodiment of the present invention, the message thread information can be classified as SMS control and set to have no repeatability.

Figure 7:
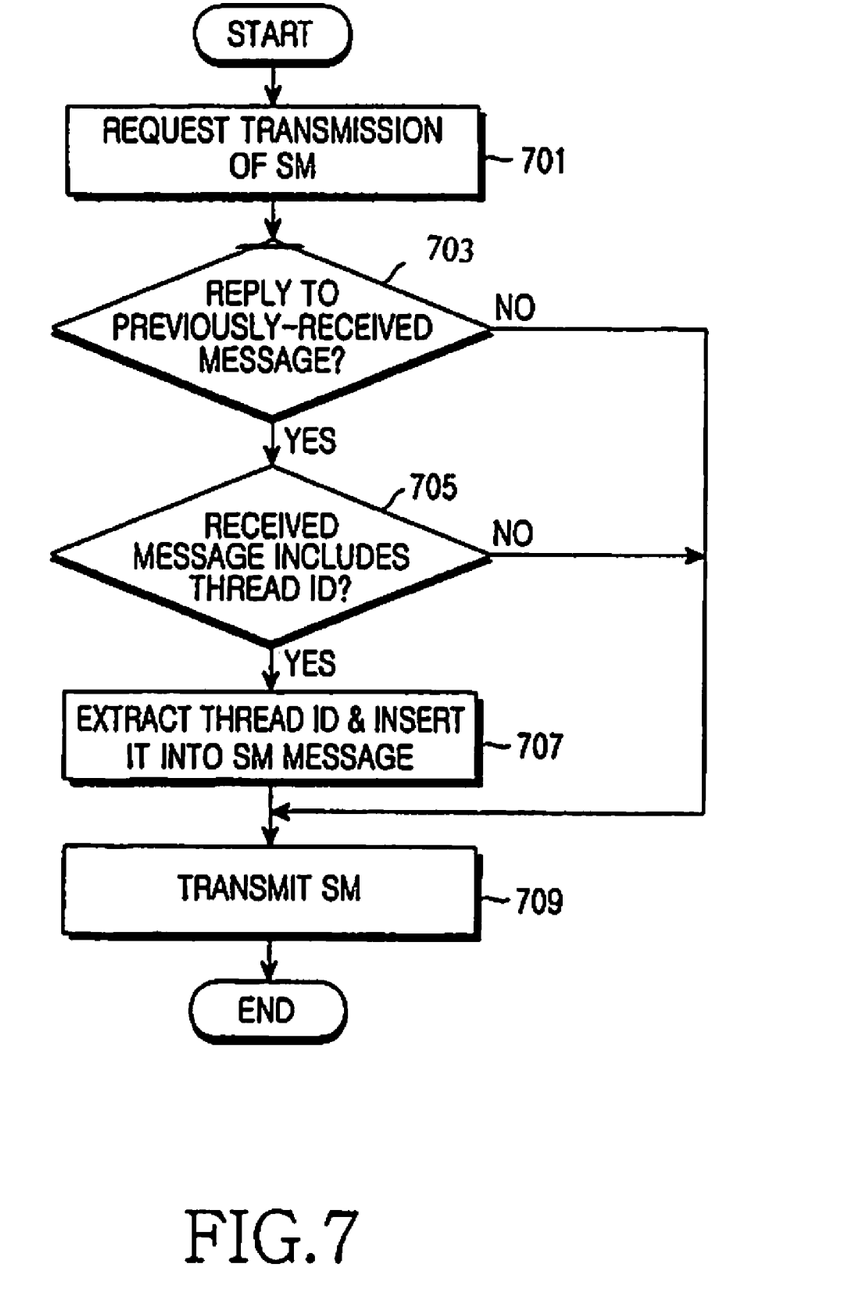
FIG. 7 illustrates a process of transmitting a short message by an MS in a case where a header of a TP-UD of a transmitted SM includes a thread ID according to the present invention.

FIG. 7 illustrates a process of transmitting a short message by an MS 60 in a case where a header of a TP-UD of a transmitted SM includes a thread ID according to an embodiment of the present invention. Referring to FIG. 7, when an MS 60 receives a request for transmission of an SM in step 701, the MS 60 proceeds to step 703. In step 703, the MS 60 checks if the SM is a new message or the reply to a previously received message. When the SM is a reply, the MS 60 proceeds to step 705; when the SM is a new message, the message can be sent right away, so the MS 60 proceeds to step 709.

In step 705, the MS 60 checks if the original message this SM is replying to contains a thread ID in the header of the TP-UD information element. When the original message this SM is replying to contains a thread ID in the header of the TP-UD information element, it proceeds to step 707. When the original message this SM is replying to does not contain a thread ID in the header of the TP-UD information element, it proceeds to step 709.

In step 707, the MS 60 extracts the thread ID and includes the extracted thread ID in the header of the TP-UD of the SM to be sent. Then, in step 709, the MS 60 sends the SM to the SMSC 50.

Figure 8:
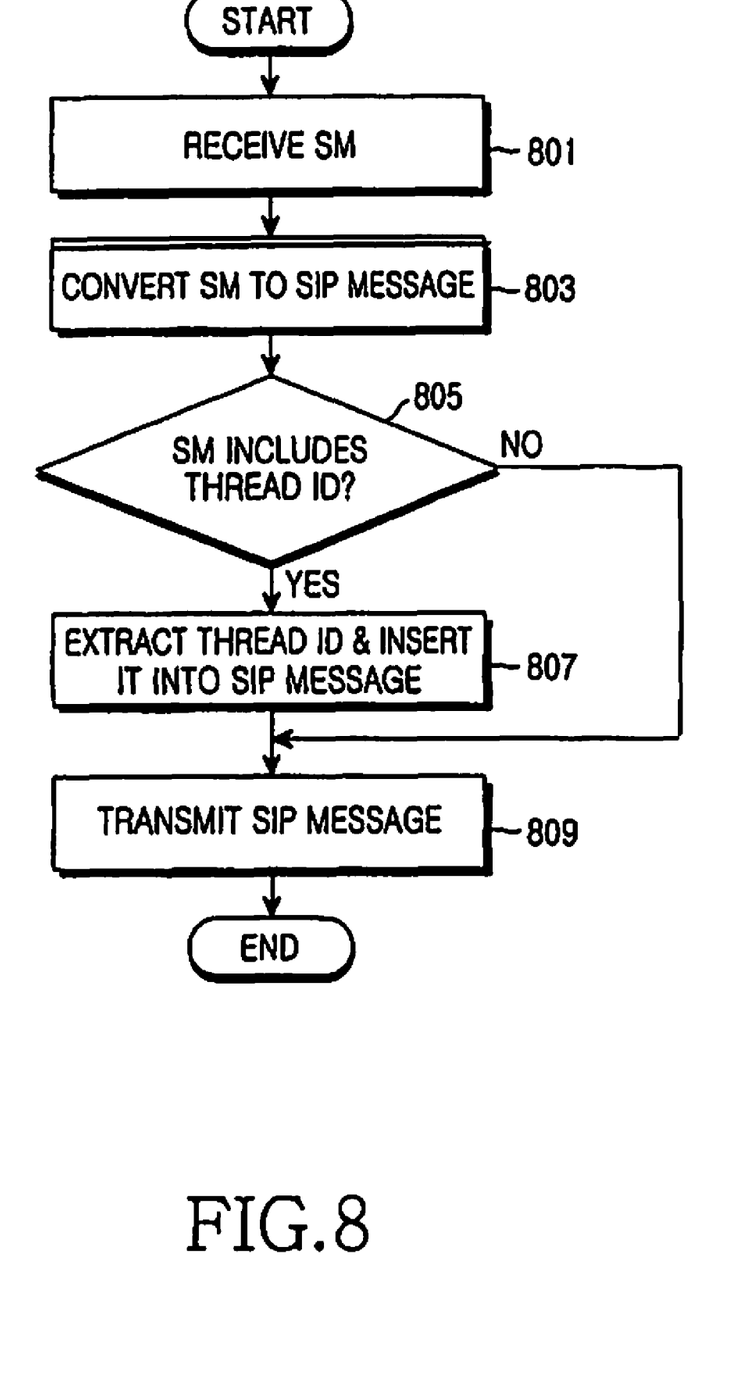
FIG. 8 illustrates an operation of an IWF according to the present invention.

The SMSC 50 transmits the received SM to the IWF 30, and the IWF 30 having received the SM operates according to the process as shown in FIG. 8.

Referring to FIG. 8, when the IWF 30 receives an SM to be sent to the CPM client 10 in step 801, the IWF 30 converts the SM to an appropriate SIP message in step 803, and then proceeds to step 805.

In step 805, the IWF 30 checks if the SM contains a thread ID information in the header of the TP-UD information element. When a thread ID is present, the IWF 30 proceeds to step 807, and when it is not, the IWF 30 proceeds to step 809, in which the IWF 30 transmits the SIP message converted in step 803.

In step 807, the IWF 30 extracts the thread ID from the TP-UD of the SM and incorporates the extracted thread ID in the SIP message as an XML document format, as shown in Table 9, and then proceeds to step 809, in which the IWF 30 transmits the SIP message to the CPM server 20. Steps 805 and 807 may be performed while the SM is converted to the SIP message in step 803.

According to another embodiment of the present invention, the thread ID information may be appended in the existing SMS TP-DA (Destination Address) information element, using the existing sub-addressing and reply-path mechanisms.

Rules for sub-addressing in the existing SMS are as follows:

An originating MS may send an SM with '*'s or '#'s included in the TP-DA field. The first '#' encountered in the TP-DA indicates where the address for SMSC routing purposes is terminated. Additional '*'s or '#'s can be present in the following digits, and all these digits including the first '#' are subaddress digits.

When the SMSC receives an SM to convey with such a subaddress information, the SMSC should deliver the SM to the destination MS with the same subaddress digits copied in the TP-OA field.

For example, when MS A having an address of 987654321 sends an SM with TP-DA of 1234#56#789* to MS B, MS B having an address of 1234 will receive the SM with TP-OA of 987654321#56#789*.

Further, a common procedure for the reply-path mechanism is as follows.

The reply path is requested by the originating MS by setting the TP-Reply-Path parameter in the SMS SUBMIT PDU of the original SM. When the original SMSC supports reply path requesting for the originating MS, it shall take notice of the TP-Reply-Path (TP-RP) parameter in the SMS-SUBMIT PDU and set the TP-RP parameter in the SMS-DELIVER PDU of the original MT SM towards the replying MS. Hence, a reply path exists for the replying MS towards the originating MS.

When a replying MS receives an original SM, it then has an originating MS address and a reply path mechanism.

The originating MS address is found in the TP-Originating-Address in the SMS-DELIVER PDU, and existence of the reply path is determined based on if the TP-RP has been set in SMS-DELIVER PDU.

When submitting the reply SM and when the reply-path is set, the replying MS should use the Originating MS address (content of TP-Originating-Address) as the TP-Destination-Address in SMS-SUBMIT PDU and submits it to the SMSC that delivered the original SM.

The original SM and the reply SM are delivered by the same SMSC. This principle maximizes the probability that the SC can e.g. route the reply SM to the proper data network for reaching the originating MS.

Hereinafter, a method for conveying the thread ID information without impacting the existing SMS system, by using the sub-addressing and reply-path mechanisms and the TP-DA, will be described.

When the IWF 30 receives a SIP message that includes a thread ID and is targeting the MS 60, the IWF 30 converts the received SIP message to an SM and appends the thread ID in the TP-DA information element of the SMS_SUBMIT PDU that contains the SM, as if the thread ID were a sub-address, i.e. <dest_address>#<thread_id>. When the original thread ID is not formed of digits, the IWF 30 needs to convert the thread ID to a unique digit sequence and keeps a mapping table between the original thread ID and the corresponding sequence in the TP-DA. The IWF 30 also sets the TP-RP (Reply Path) bit to "1", requesting therefore that the replying MS submits any reply SM to the same SMSC from which it received the original SM.

Thereafter, the IWF 30 sends an SMS_SUBMIT PDU to the SMSC 50. The SMSC 50 converts the SMS_SUBMIT PDU to SMS_DELIVER PDU and transmits the converted PDU to the MS 60. The MS 60 receives the SM from the SMSC 50 in an SMS_DELIVER PDU, that contains a TP-OA information element with the thread ID information as sub-address.

When the MS 60 sends a reply SM for the received SM, the MS 60 includes the entire content of the TP-OA of the SMS_DELIVER PDU of the received original SM, i.e. including the thread ID, in the TP-DA of the SMS_SUBMIT PDU of the reply SM, as per the reply path procedure.

Further, the MS 60 sends the reply SM to the IWF 30 via the SMSC 50, which copies the thread ID in the TP-OA of the SMS_DELIVER PDU delivered to the IWF 30.

When the IWF 30 receives the SMS_DELIVER PDU, the IWF 30 extracts the thread ID from the TP-OA information element and converts the SM to an appropriate SIP MESSAGE. The thread ID is also included in the SIP MESSAGE using the XML format described above. At this time, the thread ID may need to be converted back to the original alphanumeric thread ID sequence using the mapping table described above.

Thereafter, the IWF 30 sends the SIP message to the CPM Server 20.

Another embodiment for inserting the thread ID in the SM includes a method of inserting the thread ID in the body part of the SM, which corresponds to usage SMS-Email inter-working functionality.

In SMS-Email inter-working, the basic syntax is as follows:
When receiving an SM: [<from-address><space>]<message>
When sending an SM: [<to-address><space>]<message>
where [ ] are optional fields. The "from-address" and "to-address" can be either "user@domain1.domain2" or "User Name <user@domain1.domain2>" (in this case, the < > can also be transmitted).

It is also possible to include an optional subject for the message as follows:
[<to-address>](<subject>)<message>; or
[<to-address>]##<subject>#<message>.

Based on the above, a possible solution is to insert the thread ID instead as the "subject" of the message.

That is, when the IWF 30 receives a SIP message including a thread ID, the IWF 30 converts the SIP message to an SM and includes the thread ID as a subject in the body part of the TP-UD of the SMS_SUBMIT PDU: "##<thread ID>#<message>". The <to-address> could also be added by extracting the address (user@domain1.domain2) from the "To:" field of the SIP message.

The IWF 30 sends the SMS_SUBMIT PDU that contains the SM to the SMSC 50. Then, the MS 60 receives the SM from the SMSC 50 in an SMS_DELIVER PDU, that contains the thread ID information in the body part of the TP-UD. When the MS 60 sends a reply, it follows the same syntax, so includes the same subject (i.e. the thread ID) of the original message in the TP-UD. The MS 60 sends an SMS_SUBMIT PDU including the reply SM to the SMSC 50, and the SMSC 50 transmits the SMS_DELIVER PDU corresponding to the SMS_SUBMIT PDU to the IWF 30.

When the IWF 30 receives the SMS_DELIVER PDU, the IWF 30 extracts the thread ID from the subject of the received SM, that is, the SMS_DELIVER PDU. Further, the IWF 30 converts the SM to an appropriate SIP message, includes the thread ID in the SIP message using the XML format described above, and then sends the SIP message to the CPM Server 20.

All of the embodiments described above correspond to cases where both an SIP message transmitted by an originator CPM client and an SM transmitted to a recipient in response to the SIP message include a thread ID. According to the following embodiment described below, an IWF inter-working a CPM system and an SMS system stores and manages a thread ID allocated in accordance with an originator CPM client and a recipient MS, and does not provide the thread ID to the MS. This embodiment can be implemented without changing the conventional SMS system.

Figure 9:
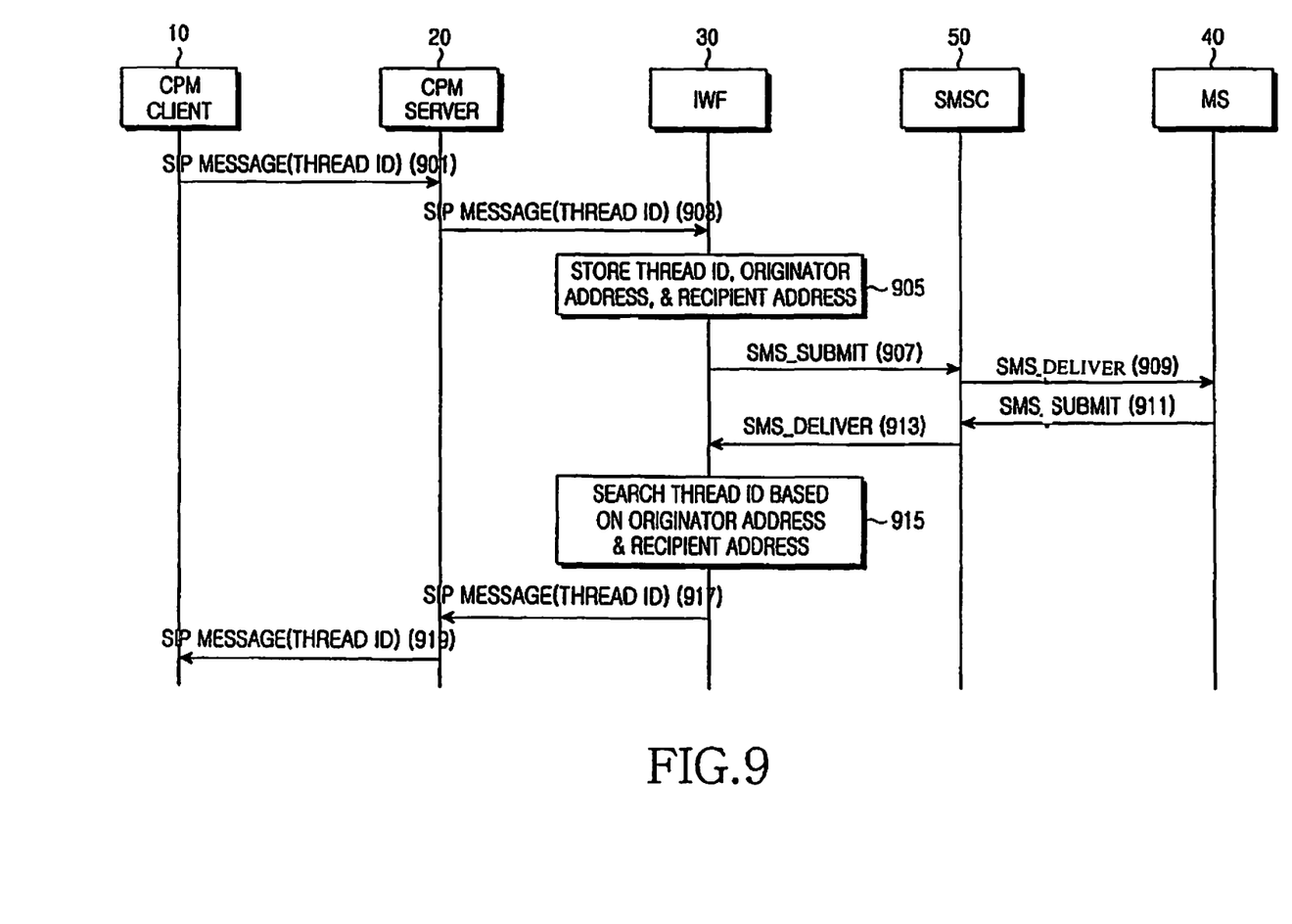
FIG. 9 illustrates a message processing procedure by a CPM system and an SM system inter-working with each other according to the present invention.

According to the present embodiment, the IWF simulates the existence of a thread in the SMS domain by storing the "thread ID, originator's address, recipient's address" in the IWF during a certain amount of time. FIG. 9 illustrates a message processing procedure by a CPM system and an SM system inter-working with each other.

In steps 901 and 903, the CPM client 10 sends an SIP message including a thread ID and a message to be transmitted via the CPM server 20 to the IWF 30. Here, the process of configuring the SIP message by the CPM client 10 is similar to the process shown in FIG. 4. The IWF 30 detects the thread ID, originator address, and recipient address, stores the detected information in the database, and then converts the SIP message to an appropriate SM. Thereafter, in step 907, the IWF 30 transmits an SMS_SUBMIT PDU including the converted SM to the SMSC 50. In step 909, the SMSC 50 transmits the message through the SMS_DELIVER PDU to the MS 60. Upon receiving the SMS_DELIVER PDU, the MS 60 sends an SMS_DELIVER_REPORT PDU to the SMSC 50 and provides the message included in the SMS_DELIVER PDU to the user, although not shown in the drawings. Further, the SMSC 50 transmits the SMS_STATUS_REPORT PDU to the IWF 30. Upon receiving the SMS_STATUS_REPORT PDU, the IWF 30 transmits "200 OK" to the CPM client 10 via the CPM server 20.

The MS 60 sends an SMS_SUBMIT PDU, which includes a reply message to the message received by the MS 60 in step 909, to the SMSC 50 in step 911. In step 913, the SMSC 50 sends a reply message through an SMS_DELIVER PDU to the IWF 30. In step 915, the IWF 30 detects the originator address and the recipient address included in the SMS_DELIVER PDU, and then obtains a thread ID corresponding to the originator address and the recipient address from the database. Then, in step 917, the IWF 30 converts the reply message to an SIP message, inserts the obtained thread ID in the SIP message, and then transmits the SIP message to the CPM server 20. In step 919, the CPM server 20 sends the SIP message to the CPM client 10.

Figure 10:
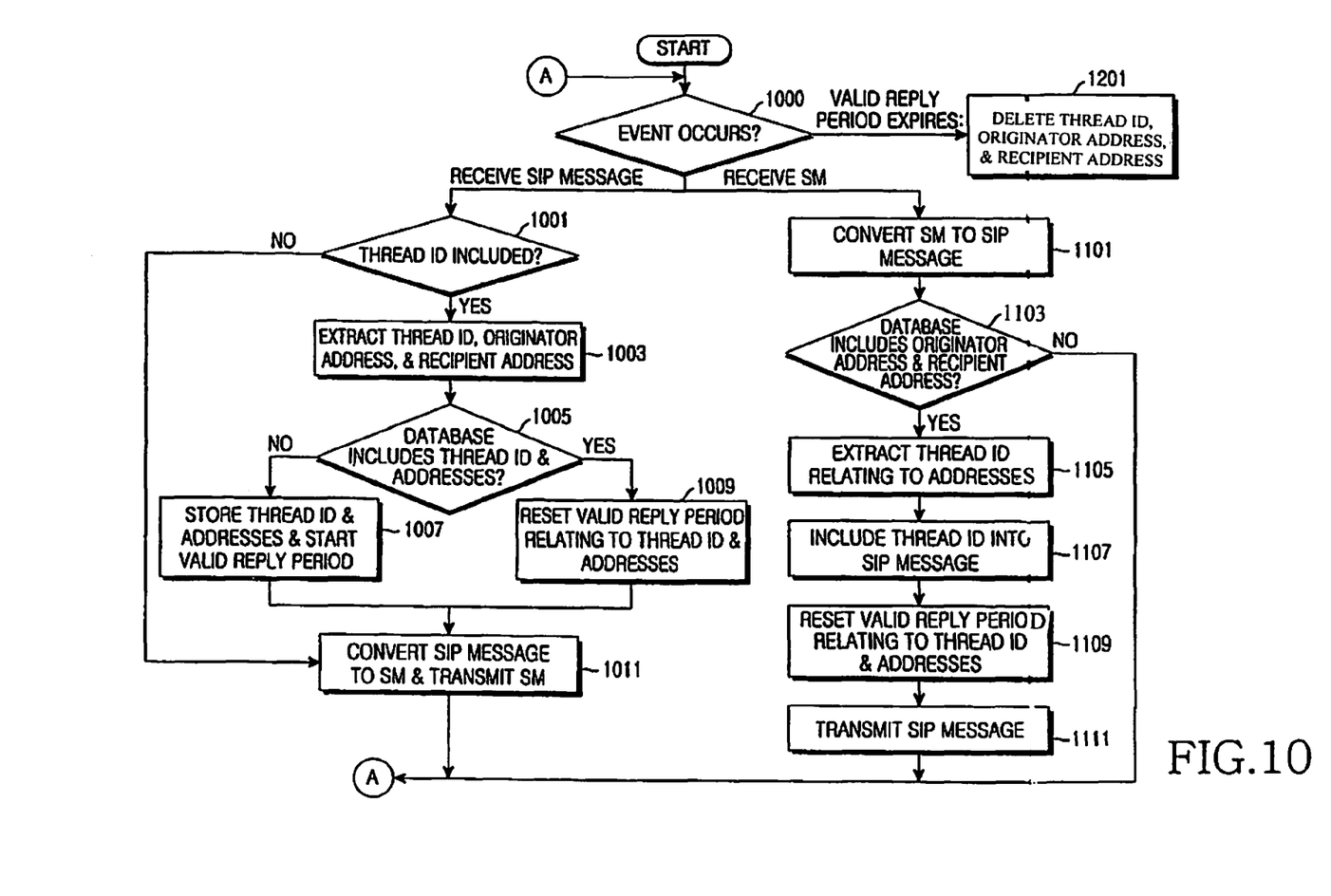
FIG. 10 illustrates an operation of an IWF according to the present invention.

The detailed procedure at the IWF 30 is illustrated in FIG. 10. Referring to FIG. 10, in step 1000, the IWF 30 waits an event to occur. Here, the event implies either reception of an SIP message or an SM or expiration of a valid reply period.

When a SIP message is received from the CPM server 20, the IWF 30 proceeds to step 1001. When an SM is received from the CPM server 20, the IWF 30 proceeds to step 1101. Further, when a valid reply period associated to a thread ID expires, the IWF 30 proceeds to step 1201.

First, a case where the IWF 30 receives an SIP message is described. Upon receiving the SIP message, the IWF 30 checks if the SIP message contains a thread ID in step 1001. When the SIP message contains a thread ID in step 1001, the IWF 30 proceeds to step 1003, otherwise the IWF 30 proceeds to step 1011. In step 1003, the IWF 30 extracts the thread ID, originator's address, and recipient's address from the SIP message, and then proceeds to step 1005. In step 1005, the IWF 30 checks if the extracted three pieces of information is in its database. When there is no such information, the IWF 30 proceeds to step 1007. When there is the extracted three pieces of information, the IWF 30 proceeds to step 1009. In step 1007, the fact that there is no such information implies that the SIP message is the first message of a new message thread (or the thread existed, but expired). The IWF 30 stores the thread ID, originator's address, and recipient's address in its database and starts a timer with a predefined valid reply period for this thread, and then proceeds to step 1011. The timer and valid reply period give the lifetime of the thread management by the IWF 30. That is, when a message associated with a corresponding thread ID is not received within the valid reply period, the corresponding thread ID and associated address information are deleted. Further, when the thread ID, originator's address, and recipient's address are found, it implies that the SIP message is a follow-up message of an existing message thread. Therefore, in step 1009, when the thread ID, originator's address, and recipient's address are found in the database, the IWF 30 recognizes that the thread is still active, and resets the timer associated with the thread to zero, to extend the lifetime management of the thread. Then, the IWF 30 proceeds to step 1011. In step 1011, the IWF 30 converts the SIP message to an appropriate SM and sends the SM to the SMSC 50 (note that no thread ID is included in the SM). Then, the IWF 30 returns back to step 1000 to wait for any new event.

When the IWF 30 receives an SM while it waits for occurrence of an event, the IWF 30 proceeds to step 1101, in which the IWF 30 converts the SM to an SIP message. Then, in step 1103, the IWF 30 checks if the pair "originator's address-recipient's address" of the SIP message is in its database. When the pair "originator's address-recipient's address" of the SIP message is in its database, the IWF 30 proceeds to step 1105. When the pair "originator's address-recipient's address" of the SIP message is not in its database, the IWF 30 considers the SIP message is the first message of a new thread or is not associated with the thread, and then proceeds to step 1111. In step 1105, the IWF 30 extracts the thread ID corresponding to the pair of addresses, and then proceeds to step 1107. In step 1107, the IWF 30 includes the extracted thread ID in the SIP message, and then proceeds to step 1109. In step 1109, the IWF 30 resets the timer associated with this thread ID to zero: since a message belonging to an existing thread has arrived, the lifetime of the thread ID is extended in the database so that it can continue to be managed. Then, the IWF 30 proceeds to step 1111, in which the IWF 30 sends the resulting SIP message to the CPM server 20. Then, the IWF 30 returns to step 1000 to wait for a new event.

When an event of expiration of a valid reply period corresponding to a thread ID occurs, the IWF 30 removes the corresponding thread ID, originator's address and recipient's address from the database in step 1201. Then, the IWF 30 returns to Step 1000 to wait for a new event.

As described above, the present invention provides methods for managing multiple message threads for the CPM service and for the CPM-SMS inter-working. The benefits of the present invention are:

The ability for a CPM user to handle a message-based conversation with another CPM user, without the need to explicitly initiate a session beforehand.

The ability for a CPM user to view all messages related to the same thread in a same conversational view.

The ability for a CPM user to have a message-based conversation with an SMS user and to benefit of the same message thread and conversational view features. The CPM user does not need to be aware that the other party does not support CPM but only SMS.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for managing a message thread including a series of messages transmitted to and received from a same counterpart by an Inter-Working Function (IWF) that interworks different messaging services, the method comprising the steps of:
    receiving, from a first client terminal that supports a Session Initiation Protocol (SIP) based Converged Internet Protocol Messaging Service (CPMS), an SIP message for conversational message communication, in which a second client terminal supporting another messaging service is appointed as a recipient terminal;
    detecting a thread ID, an address of the first client terminal, and an address of the second client terminal from the SIP message, and storing the thread ID, the address of the first client terminal, and the address of the second client terminal in a database;
    converting a message format of the SIP message into a message format that is supported in the another messaging service and transmitting the converted SIP message to the second client terminal;
    receiving a message from the second client terminal;
    if the first client terminal is a recipient terminal for the message, converting a message format of the message into a message format that is supported in the CPMS; and
    transmitting the converted message including the thread ID detected from the database to the first client terminal.

2. The method of claim 1, wherein upon receiving the SIP message transmitted from the first client terminal to the second client terminal, a valid reply period corresponding to the thread ID is reset, and if the first client terminal fails to receive a message from the second client terminal within the valid reply period, the thread ID, the address of the first client terminal, the address of the second client terminal are deleted from the database.

3. An Inter-Working Function (IWF) for interworking different messaging services and managing a message thread including a series of messages transmitted to and received from same terminals, the IWF comprising:
    a database; and
    a processor for:
    receiving, from a first client terminal that supports a Session Initiation Protocol (SIP) based Converged Internet Protocol Messaging Service (CPMS), an SIP message for conversational message communication, in which a second client terminal supporting another messaging service is appointed as a recipient terminal;
    detecting a thread ID, an address of the first client terminal, and an address of the second client terminal from the SIP message, and storing the thread ID, the address of the first client terminal, and the address of the second client terminal in the database;
    converting a message format of the SIP message into a message format that is supported in the another messaging service and transmitting the converted SIP message to the second client terminal;
    receiving a message from the second client terminal;

if the first client terminal is a recipient terminal for the message, converting a message format of the message into a message format that is supported in the CPMS; and transmitting the converted message including the thread ID detected from the database to the first client terminal.

4. The IWF of claim 3, wherein upon receiving the SIP message transmitted from the first client terminal to the second client terminal, a valid reply period corresponding to the thread ID is reset, and if the first client terminal fails to receive a message from the second client terminal within the valid reply period, the thread ID, the address of the first client terminal, the address of the second client terminal are deleted from the database.

* * * * *